United States Patent
Saleem

(10) Patent No.: US 10,837,870 B2
(45) Date of Patent: Nov. 17, 2020

(54) NON-DESTRUCTIVE APPARATUS, SYSTEM AND METHOD FOR DETERMINING PULL-OUT CAPACITY OF FRICTION NAILS

(71) Applicant: Imam Abdulrahman bin Faisal University, Dammam (SA)

(72) Inventor: Muhammad Saleem, Dammam (SA)

(73) Assignee: Imam Abdulrahman bin Faisal University, Dammam (SA)

( * ) Notice: Subject to any disclaimer, the term of this patent is extended or adjusted under 35 U.S.C. 154(b) by 646 days.

(21) Appl. No.: 14/880,180

(22) Filed: Oct. 9, 2015

(65) Prior Publication Data

US 2017/0102300 A1 Apr. 13, 2017

(51) Int. Cl.
*G01N 19/02* (2006.01)
*G01M 99/00* (2011.01)
*G01N 29/00* (2006.01)

(52) U.S. Cl.
CPC ............ *G01M 99/00* (2013.01); *G01N 19/02* (2013.01); *G01N 29/00* (2013.01); *G01N 2203/0039* (2013.01); *G01N 2203/0083* (2013.01)

(58) Field of Classification Search
CPC ........... G01N 29/00; G01N 2203/0039; G01N 2203/0083
See application file for complete search history.

(56) References Cited

U.S. PATENT DOCUMENTS

| 4,062,229 A * | 12/1977 | Godfrey ................ G01H 13/00 73/582 |
| 5,798,981 A * | 8/1998 | Littlejohn ............ G01N 29/045 367/13 |
| 7,555,931 B2 | 7/2009 | Palmer |
| 9,524,634 B2 * | 12/2016 | Tillotson ................. H04Q 9/00 |

(Continued)

FOREIGN PATENT DOCUMENTS

| CN | 1793897 A | 6/2006 |
| JP | 56-154642 A | 11/1981 |

(Continued)

OTHER PUBLICATIONS

Priyantha W. Jayawickrama, et al., "Non-Destructive Evaluation of Installed Soil Nails", Multidisciplinary Research in Transportation, Dec. 2007, 260 pages.

*Primary Examiner* — Matthew G Marini
(74) *Attorney, Agent, or Firm* — Oblon, McClelland, Maier & Neustadt, L.L.P.

(57) ABSTRACT

Embodiments include an apparatus for determining a pull-out capacity of a nail disposed in concrete. The apparatus includes control processing circuitry and a Schmidt hammer electrically connected to the control processing circuitry. The Schmidt hammer is configured to strike the nail during a test event and to record a rebound value for the nail. The control processing circuitry is configured to calculate an estimated pull-out strength for the nail using the rebound value of the nail that resulted from the test event, a predetermined nail length, a predetermined nail penetration depth (Continued)

in the concrete, and an estimated predetermined strength of concrete. The apparatus also includes a remote computer configured to communicate with the control processing circuitry and to store an estimated pull-out strength of the nail. The control processing circuitry includes a memory and a database.

17 Claims, 15 Drawing Sheets

(56) References Cited

U.S. PATENT DOCUMENTS

| | | | | |
|---|---|---|---|---|
| 2011/0181393 A1* | 7/2011 | Tillotson | ............ | H04Q 9/00 340/10.1 |
| 2012/0174525 A1* | 7/2012 | Hinshaw | ............ | B25F 5/00 52/741.1 |
| 2017/0315034 A1* | 11/2017 | Morgan | ............ | G01N 3/08 |

FOREIGN PATENT DOCUMENTS

| | | | | |
|---|---|---|---|---|
| JP | 56154642 A | * | 11/1981 | ......... G01L 5/0033 |
| JP | 2008-65708 A | | 3/2008 | |
| JP | 2015-45637 A | | 3/2015 | |

* cited by examiner

NON-DESTRUCTIVE APPARATUS, SYSTEM AND METHOD FOR DETERMINING PULL-OUT CAPACITY OF FRICTION NAILS

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In construction technology, pull-out testing generally establishes the holding force of friction/anchor nails and fixings in most construction materials, such as concrete. Conventional pull-out testing of friction/anchor nails requires applying a specific tensile load to a friction nail in order that the friction nail can sustain such a test condition for a period of time.

Nondestructive testing or non-destructive testing (NDT) is a wide group of analysis techniques used in science and industry to evaluate the properties of a material, component or system without causing damage.

Friction/anchor nails are extensively used in the construction industry. Applications range from supporting temporary non-structural elements to fixing support elements in wooden housing industry. Friction nails may also be used for a variety of general purposes such as for supporting netting to prevent damage caused from falling debris, installing plastic sheets to prevent moisture movement, supporting temporary structures, etc. There are mainly two types of friction/anchor nails used in the construction industry: (1) mechanically installed concrete friction nails installed using impact loading without drilling a hole that owe the strength capacity to frictional force and (2) epoxy anchors installed by drilling a hole and fixing the anchor using epoxy resin.

Although the epoxy anchors are stronger, they are difficult to install and require more care, time and skilled labor whereas for general purposes where time and space are limited the mechanically installed friction nails are more efficient and effective. Even though these types of nails are widely used in the construction industry, there exists no non-destructive method of estimating the strength capacity of friction/anchor nails as recognized by the present inventor. Conventionally, the pull-out capacity of large friction nails embedded in reinforced concrete shear walls in nuclear power plants has been tested using a destructive method, but for small friction nails installed using impact loading there exists no field testing method in this regard.

Further, the time, effort, cost, and equipment needed to conduct conventional pull-out testing can be extensive and tedious, requiring skilled labor, a linear variable displacement transducer (LVDT), a data acquisition system, and hydraulic pumps with pressure gauges. Conventional material testing and quality assurance may play a pivotal role in every major construction project. Currently, for large scale projects an on-site material testing and quality assurance lab may be established. Hence, as recognized by the inventor, quick, reliable and effective methods and apparatuses are needed to achieve the quantitative analysis of material strength fixed to ground.

SUMMARY

Embodiments include an apparatus for determining a pull-out capacity of a nail disposed in concrete. The apparatus includes control processing circuitry and a Schmidt hammer electrically connected to the control processing circuitry. The Schmidt hammer is configured to strike the nail during a test event and to record a rebound value for the nail. The control processing circuitry is configured to calculate an estimated pull-out strength for the nail using the rebound value of the nail that resulted from the test event, a predetermined nail length, a predetermined nail penetration depth in the concrete, and an estimated predetermined strength of concrete.

Embodiments also include a non-destructive method for determining a pull-out capacity of a nail disposed in concrete. The method includes impacting a Schmidt hammer on the nail. The method also includes recording in a computer memory a hammer rebound value from the Schmidt hammer. The method further includes comparing with circuitry the recorded rebound value with a stored value that is an association of the hammer rebound value to pull-out strength so as to estimate a pull-out load carrying capacity of the nail.

Embodiments further include a system for determining a pull-out capacity of a nail disposed in concrete. The system includes control processing circuitry. The system also includes a Schmidt hammer electrically connected to the control processing circuitry. The Schmidt hammer is configured to strike the nail during a test event and to record a rebound value for the nail. The system further includes a remote computer configured to communicate with the control processing circuitry and to store an estimated pull-out strength of the nail. The control processing circuitry includes a memory and a database. The system also includes a global positioning system (GPS) receiver configured to triangulate from wireless transmissions a plurality of location transmitters a location of the nail that is being installed in which the remote computer stores the location, with a nail ID, and associates the nail ID and location with the rebound value and the estimated pull-out strength. The control processing circuitry is configured to calculate the estimated pull-out strength for the nail using the rebound value of the nail that resulted from the test event, a predetermined nail length, a predetermined nail penetration depth in the concrete, and an estimated predetermined strength of concrete.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Currently there exists several commercially available devices which can be used to evaluate the loading capacity of concrete friction/anchor nails, however all of them rely on destructive testing. The present disclosure develops a non-destructive method for load capacity evaluation by relating a pull-out strength of concrete anchor nails to a rebound value of Schmidt hammer, which traditionally is used to measure the compressive strength of concrete. The Schmidt hammer was developed in 1948 by a Swiss engineer Ernst Schmidt and is a portable, cost-effective instrument capable of estimating the elastic properties of hardened concrete. The Schmidt hammer is a practical non-destructive method that has been used worldwide as an index test estimating the compressive strength of concrete.

There are two types of Schmidt hammers: (1) L-type, usually used for rock and (2) N-type, used for concrete. The degree of rebound varies, depending upon the concrete elastic properties.

A non-destructive testing method for estimating the load carrying capacity of friction/anchor nails is disclosed by developing a relationship between the N-type rebound hammer value, R and the strength capacity of anchor friction nail. Deformation of the friction nail may be measured to understand the relationship between force and displacement. It was observed that the rebound value of the Schmidt hammer may be affected by the hardness of the friction nail head, penetration depth, friction nail length, concrete strength, the damage caused inside the concrete, nail alignment and the interfacial frictional force between concrete and nail. Experimental investigation revealed that owing to the rebound hammer's impact load, cracking at the interface of coarse aggregate and matrix occurred. Furthermore the effect of friction nail alignment and penetration depth has been studied with results showing that in the case of non-vertical nails, high pull-out load capacity cannot be achieved. A mathematical relationship between pull-out strength and test hammer rebound value, R for 50 mm and 38 mm length nails with penetration depths of 10 mm and 20 mm is also disclosed.

The present disclosure explores the existence of the relationship between the Schmidt hammer rebound value R and the pull-out strength of friction/anchor nails. The influence on concrete under the application of impact loading has also been studied and investigated using advanced microscope evaluation with ink injection method. The present disclosure takes into consideration the effect of friction nail length, concrete strength, friction nail penetration depth along with the environmental factors and corrosion on the strength capacity.

Figure 1:
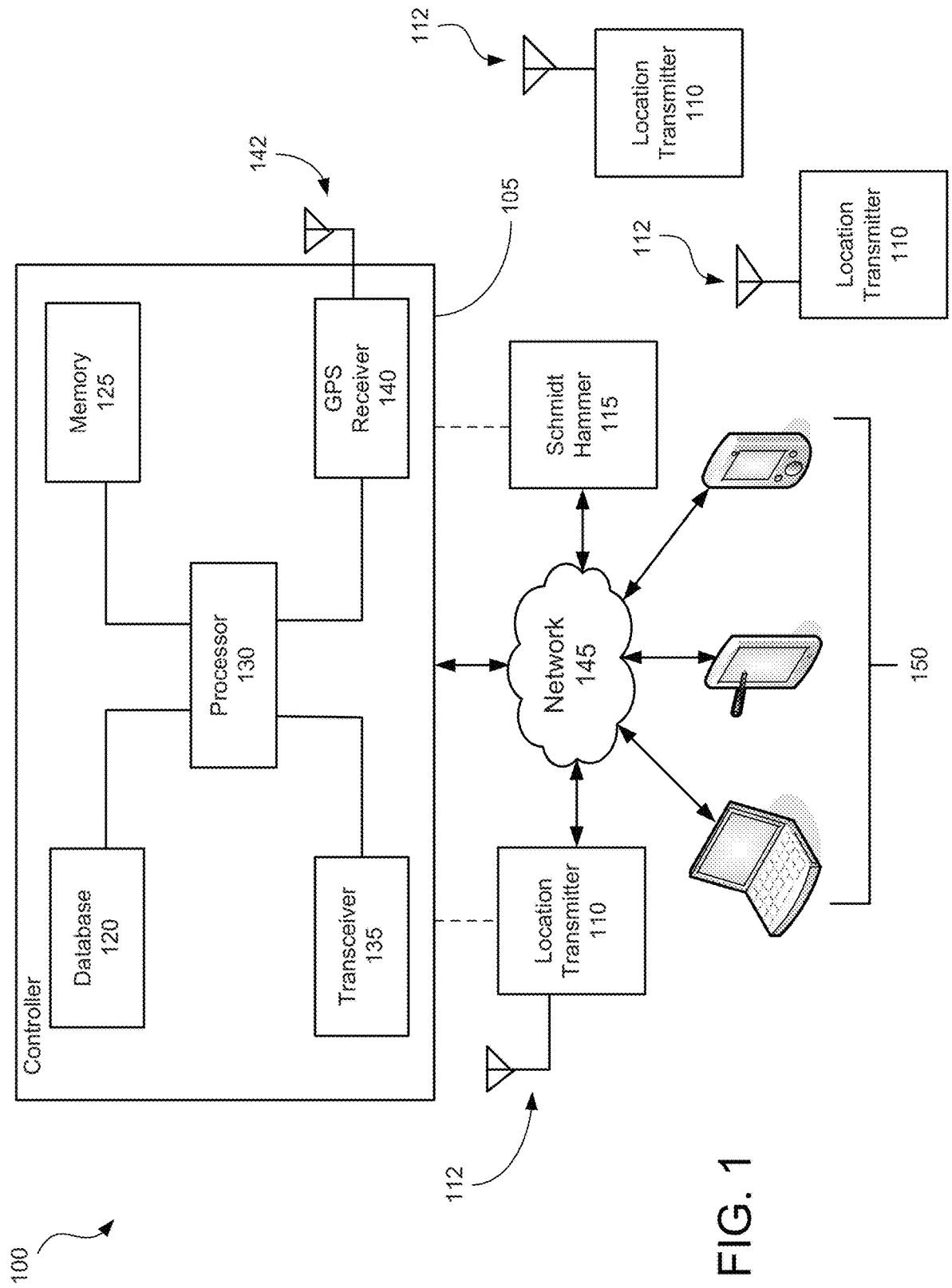
FIG. 1 is a block diagram of a non-destructive apparatus and system for determining pull-out capacity of friction nails according to certain embodiments of the disclosure.

Referring now to the drawings, wherein like reference numerals designate identical or corresponding parts throughout the several views, FIG. 1 is a block diagram of a non-destructive apparatus and system 100 for determining pull-out capacity of friction nails according to certain embodiments of the disclosure. In FIG. 1, apparatus and system 100 may include a controller 105, location transmitters 110, a Schmidt Hammer apparatus 115, and a network 145.

Controller 105 may include a database 120, a memory 125, a processor 130, a transceiver 135, and a GPS receiver 140. In some embodiments, database 120 may include a plurality of databases, memory 125 may include a plurality of memories, processor 130 may include a plurality of processors, transceiver 135 may include a plurality of transceivers, and GPS receiver 140 may include a plurality of GPS receivers. Controller 105 may be connected to network 145 via Ethernet, WiFi, cellular, and Internet or the like.

Processor 130 may be configured to compare data received from Schmidt hammer apparatus 115, such as rebound value, R to data stored in database 120, such as penetration depth, friction nail length, friction nail vertical alignment with respect to a concrete base (i.e., perpendicular to the concrete base), and strength of the concrete, each as predetermined values or data.

Network 145 may be connected via Ethernet, WiFi, cellular, Internet or the like to a remote computer 150, such as a laptop computer, a tablet computer, and/or a smartphone, or the like.

In certain embodiments, remote computer 150 may be configured to monitor an installation process in real time of each friction nail and provide feedback to an installer whether a particular installed anchor has the required pull-out load carrying capacity.

In some embodiments remote computer 150 may be configured to monitor an installation process in real time of each friction nail and provide a certification report for all the friction/anchor nails installed on a particular job so corrective action may be taken later on the anchor nails that were installed incorrectly.

Location transmitters 110 may include a plurality of location transmitters connected to network 145 via WiFi, cellular, or the like and/or electrically connected to controller 105 directly. Schmidt hammer apparatus 115 may include a plurality of Schmidt hammer apparatuses connected to network 145 via Ethernet, WiFi, cellular, Internet and/or the like or electrically connected to controller 105 directly.

Location transmitters 110 are disposed at three distinct distances about an installation site, each transmitting beacon signals to the Schmidt hammer 115. The Schmidt hammer 115 records a particular location of the friction nail being tested by using triangulation and a GPS coordinate from the GPS receiver 140. Thus, each tested friction nail is assigned a unique ID that is saved in association with particular locations and a Schmidt hammer rebound value, R.

Moreover, friction nails are assigned an identifier anchor ID for each friction nail and transmitted to controller 105 via network 145. Further, the processor 130 may be configured to perform a triangulation calculation in the Schmidt hammer 115 based on the transmissions to geo-locate the friction nails. Alternatively, the controller 105 may be a separate device than the Schmidt hammer 115 and may perform the triangulation calculations on behalf of the Schmidt hammer 115 based on the data collected by the Schmidt hammer 115. Location transmitters 110 may include triangulation antennas 112 incorporated therein. For this example, in order to perform the triangulation calculation a combination of at least three location transmitters 110 (base stations) may be used.

For example, in some embodiments, controller 105 includes triangulation antennas 112 connected to a plurality of location transmitters 110 to accurately locate a particular friction nail that is being installed in which the remote computer 150 stores the location, with an nail ID, and associates the nail ID and location with the Schmidt hammer measurement estimated pull-out load carrying capacity, P.

Schmidt hammer apparatus 115 may be disposed proximal each friction nail for determining and transmitting a Schmidt hammer rebound value, R for each friction nail to controller 105 via network 145. In some embodiments, Schmidt hammer apparatus 115 may include or be electrically connected to transceiver 135 to provide a wireless communications capability.

Database 120 may include stored rebound values, R, correlated with stored pull-out strengths of similar friction nails based on nail length, nail penetration depth, concrete strength, and nail alignment. Transceiver 135 may include a cellular transmitter and receiver configured to communicate with network 145, location transmitters 110, and/or Schmidt hammer apparatus 115.

Figure 2:
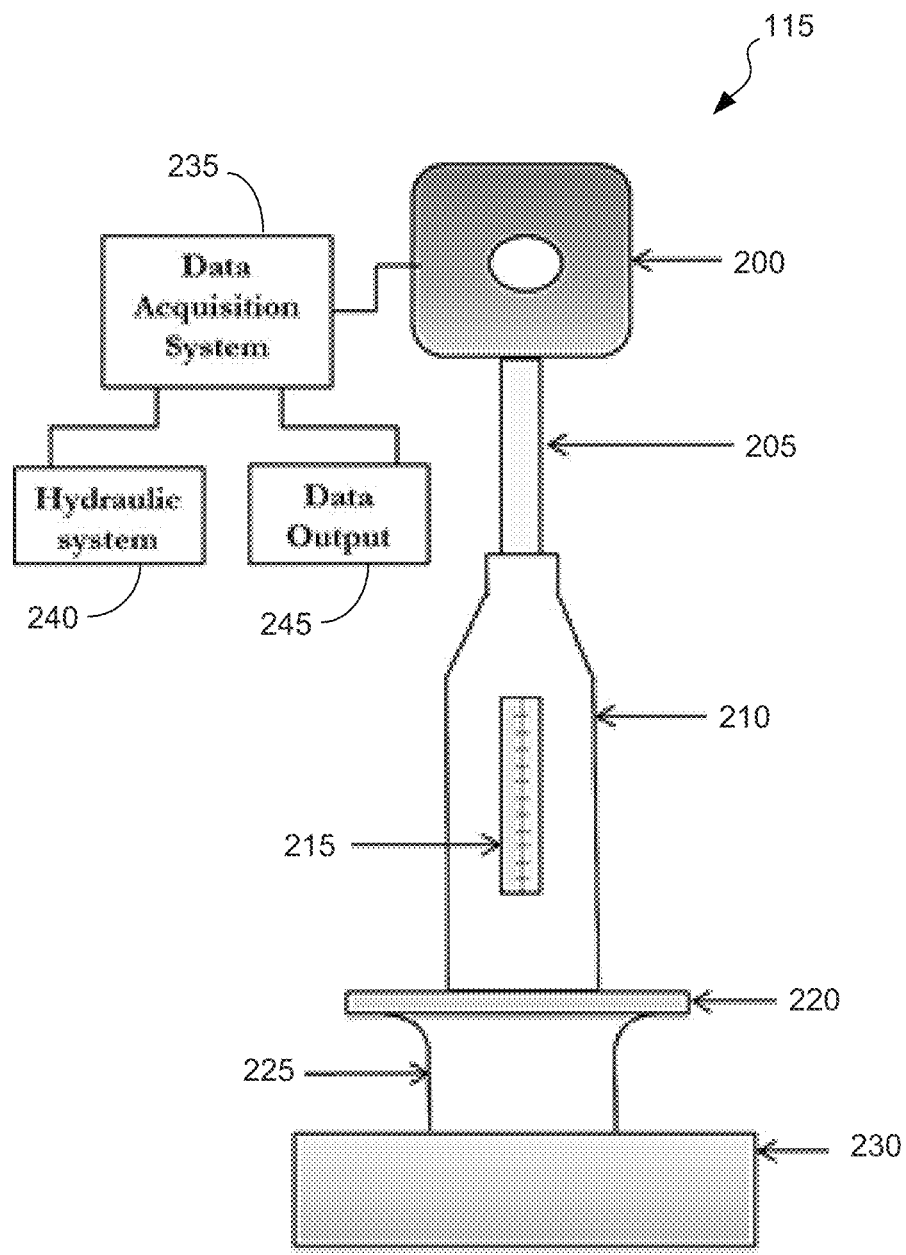
FIG. 2 is a schematic diagram of a Schmidt hammer apparatus according to certain embodiments of the disclosure.

FIG. 2 is a schematic diagram of a Schmidt hammer apparatus 115 according to certain embodiments of the disclosure. In FIG. 2, apparatus 115 may include a load cell 200, a plunger 205, a Schmidt hammer 210, a rebound number indicator 215, a bearing plate 220, a moveable base 225, and a hydraulic assembly 230. Apparatus 115 may also include a digital data acquisition system 235, a hydraulic system 240 and a data output device 245.

In FIG. 2, the Schmidt hammer apparatus 115 may be used to measure the rebound number, R via indicator 215 and impact load via load cell 200 imparted by the Schmidt hammer 210. In operation, the base of the hammer 210 may be fixed and the plunger 205 may be lowered gradually, finally the impact load may be recorded by the digital data acquisition system 235.

Data output device 245 may be electrically connected to data acquisition system 235 and to controller 105 and/or connected to network 145 via Ethernet, WiFi, cellular, and Internet or the like.

Schmidt hammer apparatus 115 may be configured to determine an impact load on friction nails. Friction nails used in the construction industry are subjected to a variety of loadings during their life cycle. During the life cycle these nails are subjected to a variety of environmental and physical loadings. Loadings vary from monotonic loading to cyclic loading to impact loading. Much research in the past has been focused on the effect of monotonic and cyclic loading. The present disclosure discusses the effect of impact loading on the load-carrying capacity of friction nails, for example, 38 millimeter (mm) and 50 mm length nails with varying penetration depths of 10 mm and 20 mm and concrete strength were subjected to impact loading. The impact loading is such that is generated using a Schmidt hammer apparatus 115, for example, a Concrete Rebound Schmidt Hammer. Concrete quality, friction nail alignment, friction nail length, and water ingress were taken into consideration. An analytical model is also disclosed which takes into consideration the interfacial bonding between the nail and surrounding concrete matrix, nail geometric shape, friction nail length, alignment and penetration depth. Pull-out deformational response comparison between the analytical model and experimental results reveals that the model is successfully able to depict the maximum load carrying capacity and the pull-out mechanism as per experimental investigation. From the analysis and presented results it is evident that the bond performance of the friction nails, friction nails embedded in poor quality concrete, water ingress and hidden defects can be identified by imparting the impact energy.

Further, work in the past has been focused on evaluating the deformational response of friction nails subjected to either monotonic or cyclic loading with little attention on the effects of impact loading. In this regard, the present disclosure discusses the effects of impact loading on the deformational response of friction nails and aims to evaluate the bond performance of pre-construction installed friction nails subjected to impact loading. The factors affecting the friction nail pull-out strength such as inherent defects in surrounding concrete, penetration depth, friction nail length, its alignment and water ingress are taken into consideration. The length of friction nails may be, for example, 38 mm and 50 mm. A computer-based analytical circuitry capable of successfully predicting the pull-out deformational response is also disclosed. In certain embodiments, the quality of bond plays a crucial role in overall load carrying capacity, P and friction nails with poor bond depict lower rebound number, R while friction nails with good bond result in a higher rebound number, R.

Embodiments of the present disclosure explain a relationship between the pull-out load carrying capacity, P, of concrete friction nails and the Schmidt hammer rebound value, R. In some embodiments, the load carrying capacity of the concrete friction nails depends on friction nail penetration depth, friction nail length, concrete strength, and friction nail alignment. The effect of friction nail alignment on load carrying capacity shows that friction nails with misalignment of more than 5% from vertical can lead to lower load carrying capacity. In addition, it is also possible to identify the misaligned concrete friction nails and friction nail installed in poor quality concrete using the test data comparisons.

Figure 3A:
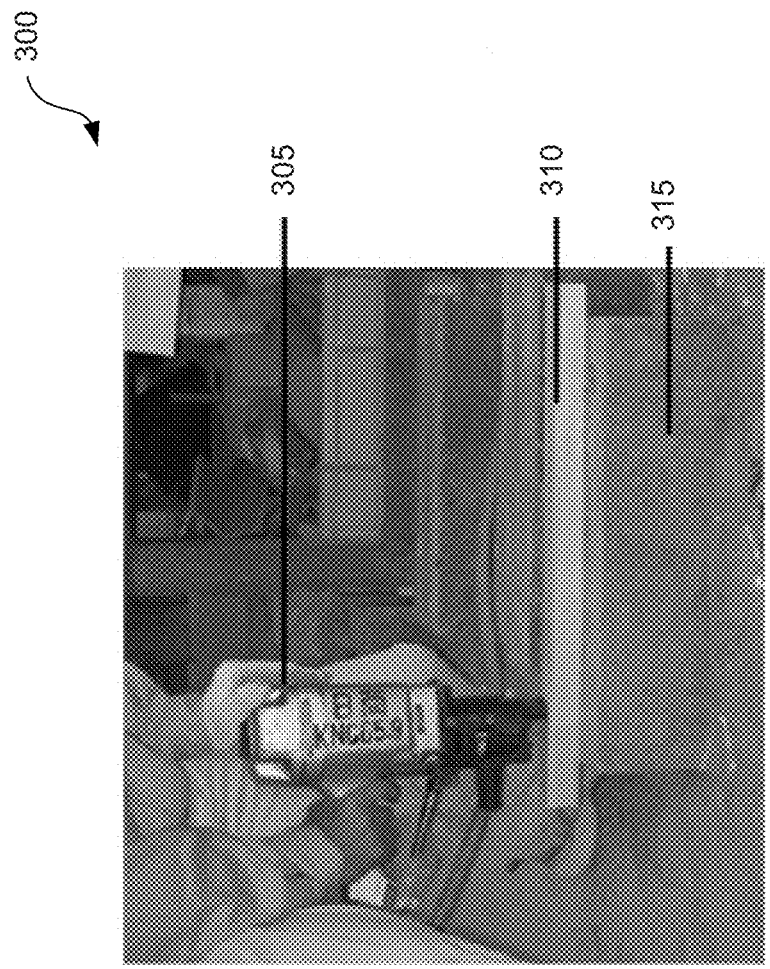
FIG. 3A is an illustrative view of an friction nail installation using an impact loading machine according to certain embodiments of the disclosure.

FIG. 3A is an illustrative view of a friction nail installation 300 using an impact loading machine 305 according to certain embodiments of the disclosure. In FIG. 3A, the anchor/friction nail installation procedure 300 may include installing friction nails in concrete 315 using impact loading machine 305, such as an air gun or the like. In some embodiments, a wooden guide block 310 may be placed on the surface of concrete 315 to guide the anchor/friction nail installation 300. Table 1 shows the values of friction nail lengths, wooden guide thickness, and embedment or penetration depth.

TABLE 1

Friction nail Length, Wooden Guide Thickness and Penetration Depth Values

| No. | Friction nail Length (mm) | Wooden Guide Thickness (mm) | Penetration Depth (mm) |
|---|---|---|---|
| 1 | 38 | 30 | 10 |
| 2 | 38 | 30 | 20 |
| 3 | 50 | 40 | 20 |

Figure 3C:
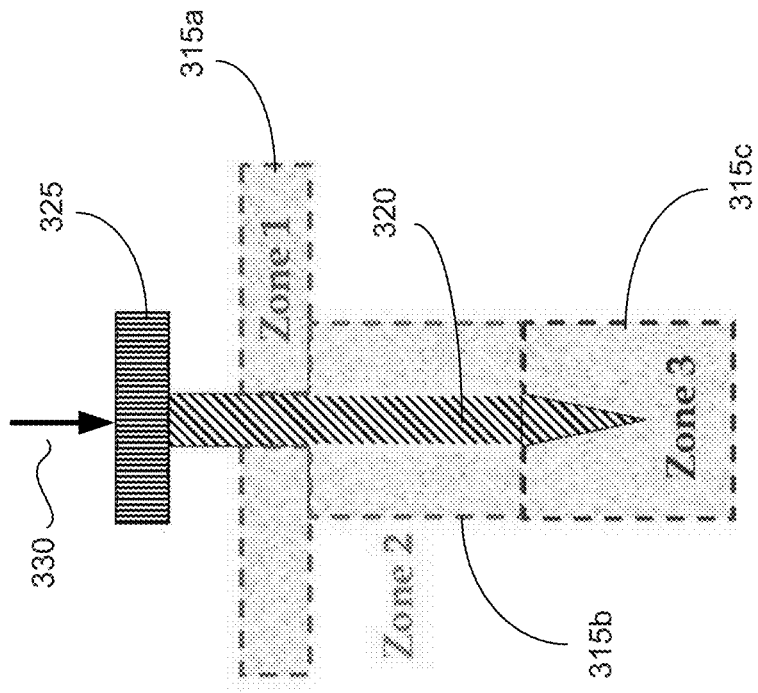
FIGS. 3B and 3C are cross sectional views of damage zones along a length of an friction nail according to certain embodiments of the disclosure.
Figure 3B:
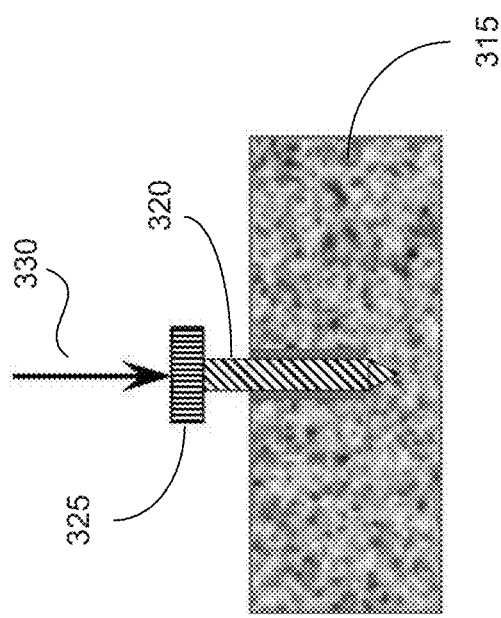

FIGS. 3B and 3C are cross sectional views of damage zones (315a, 315b, 315c) along a length of a friction nail 320 according to certain embodiments of the disclosure. In FIG. 3B, friction nail 320 includes a head portion 325 where an impact load 330 may be placed to drive friction nail 320 into concrete 315.

Figure 5:
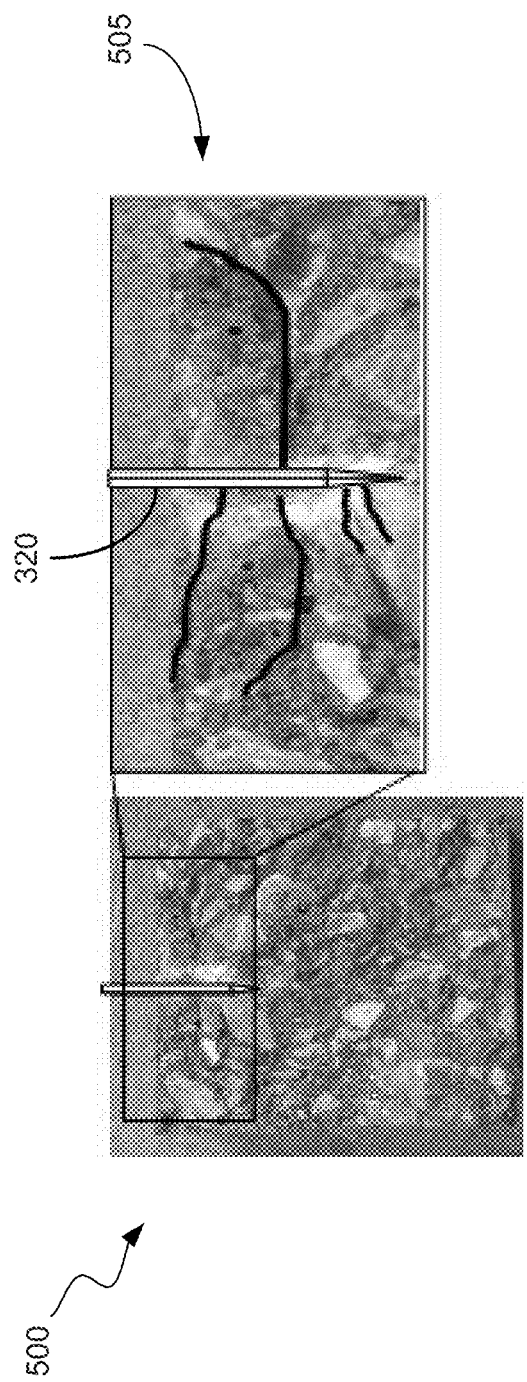
FIG. 5 is a cross sectional view of microscopic damage inside a concrete sample according to certain embodiments of the disclosure.

FIG. 3C illustrates the factors affecting the response of concrete to impact loading generated by the Schmidt hammer 210. During friction nail installation in concrete by impact loading some damage may occur on the surface of concrete 315. In FIG. 3C, the damage zone of the concrete has been divided into three distinct zones, zone 1 at 315a, zone 2 at 315b, and zone 3 at 315c, as shown in FIG. 3C. Zone 1 at 315a is the top cover layer which can get damaged during the installation of the friction nails 320, followed by the intermediate zone or zone 2 at 315b where interfacial cracks may be observed as shown in FIG. 5. These interfacial cracks occur due to the penetration of the friction nail 320 into concrete 315. The bottom zone or zone 3 at 315c is the energy transfer zone where the impact energy at 330 is transferred to the surrounding concrete 315. It can be noted that friction/anchor nails 320 owe most of the strength carrying capacity to the intermediate zone or zone 2 at 315b. Ink injection method was employed to study the interfacial cracking, it was observed during microscopic evaluation that the denser intermediate zone or zone 2 at 315b resulted in a higher load carrying capacity as compared to the friction nails with cracked interfacial zones. The main reason being the ability to transfer frictional force to the surrounding concrete, it was also seen that when the surface damage was large the cracks inside the concrete became thinner and longer. Furthermore, it was seen that the presence of aggregate below the tip of the friction nail 320 results in bending of the friction nail 320 which may lead to poor pull-out strength and large damage to the surrounding concrete 315.

In certain embodiments, the rebound value, R of Schmidt hammer 210 may be affected by the hardness of the nail head 325, the damage caused inside the concrete, and the interfacial frictional force between concrete and friction nail 320 and the penetration depth. It was also noticed that the friction nail alignment may play a significant role in the overall strength carrying capacity, P. The verticality of the friction nails 320 was monitored and +5° margin was given. It was seen that vertical friction nails were able to carry the maximum pull-out load while non-vertical friction nails were not able to carry a large pull-out load.

The vertical alignment of test hammer with friction nail 320 was adjusted by visual inspection and the Schmidt hammer tip was perpendicular to friction nail head as shown in FIGS. 3B and 3C. Three readings were categorized as one set and the average value was used for further calculations as shown in Table 2 below.

TABLE 2

Test Hammer Reading and Pull-out Load for 38 mm Length Nail with 10 mm penetration depth

| Nail No. | $R_1$ | $R_2$ | $R_3$ | $R_{ave}$ | P (N) | Comments |
|---|---|---|---|---|---|---|
| 1 | 19 | — | 13 | 16.0 | 4.50 | V |
| 2 | 18 | 14 | 21 | 17.7 | 7.54 | V |
| 3 | 11 | 15 | — | 13.0 | 7.24 | NV |
| 4 | 21 | 22 | 19 | 20.7 | 15.00 | V |
| 5 | 22 | 27 | 32 | 27.0 | 38.12 | V |

Figure 4:
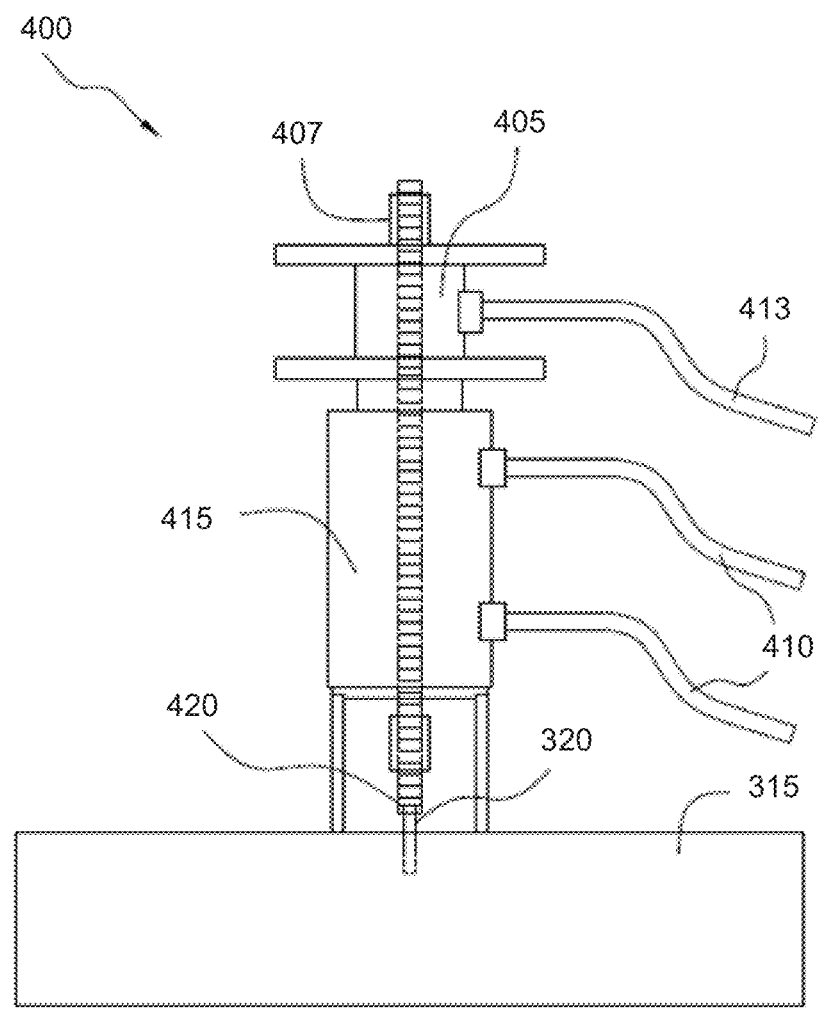
FIG. 4 is a schematic diagram of a pull-out assembly for pull-out testing of friction nails from a concrete structure according to certain embodiments of the disclosure.

FIG. 4 is a schematic diagram of a pull-out assembly 400 for pull-out testing of friction nails 320 from a concrete structure 315 according to certain embodiments of the disclosure. In FIG. 4, pull-out assembly 400 is attached via a weld point 420 to a friction nail 320 embedded in concrete 315, or the like. Hydraulic feed lines 410 are connected to a center hold jack 415, or the like. A load cell 405 is disposed atop the center hold jack 415 with a support rod 407 which is connected to the weld point 420 and passes through load cell 105 and jack 415. Load cell 405 is connected to an output line 413 which is configured to read the load applied to friction nail 320 during testing. The anchor 320 may be disposed in a concrete block or wall 315 for pull-out testing purposes. The load cell 405 may be a LVDT and the output line 413 may be connected to a data acquisition system similar to system 235 in FIG. 2. Further, feed lines 410 may be connected to pressure gauges.

FIG. 5 is a cross sectional view of microscopic damage 500 inside a concrete sample 315 according to certain embodiments of the disclosure. In FIG. 5, inset 505 shows a screw rod welded to the head of friction nail 320 and the maximum pull-out load may be recorded using load cell 405, for example, a 100 kN load cell placed at the top of center hole jack 415 as shown in FIG. 4.

Figure 6A:
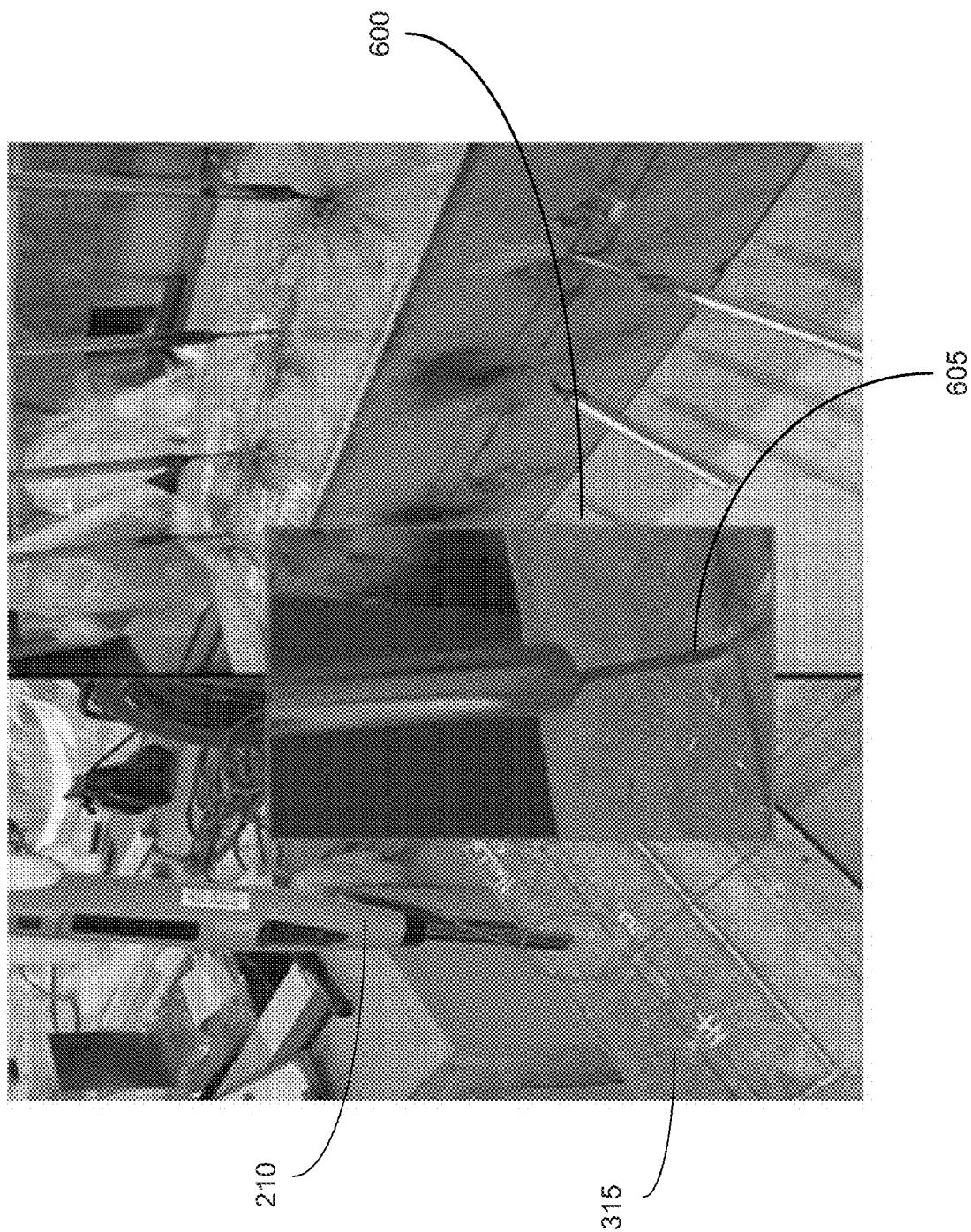
FIG. 6A is an illustrative view with an inset magnified view of a Schmidt hammer apparatus impacting a welded screw rod according to certain embodiments of the disclosure.

FIG. 6A is an illustrative view with an inset 600 magnified view of a Schmidt hammer apparatus 210 impacting a welded screw rod 610 according to certain embodiments of the disclosure. In FIG. 6A, after the installation of friction nail 620 the guide block 310 may be removed and hammer rebound values, R may be taken at the head 325 of friction nail 320 as shown in the inset 600 of FIG. 6A.

Figure 6B:
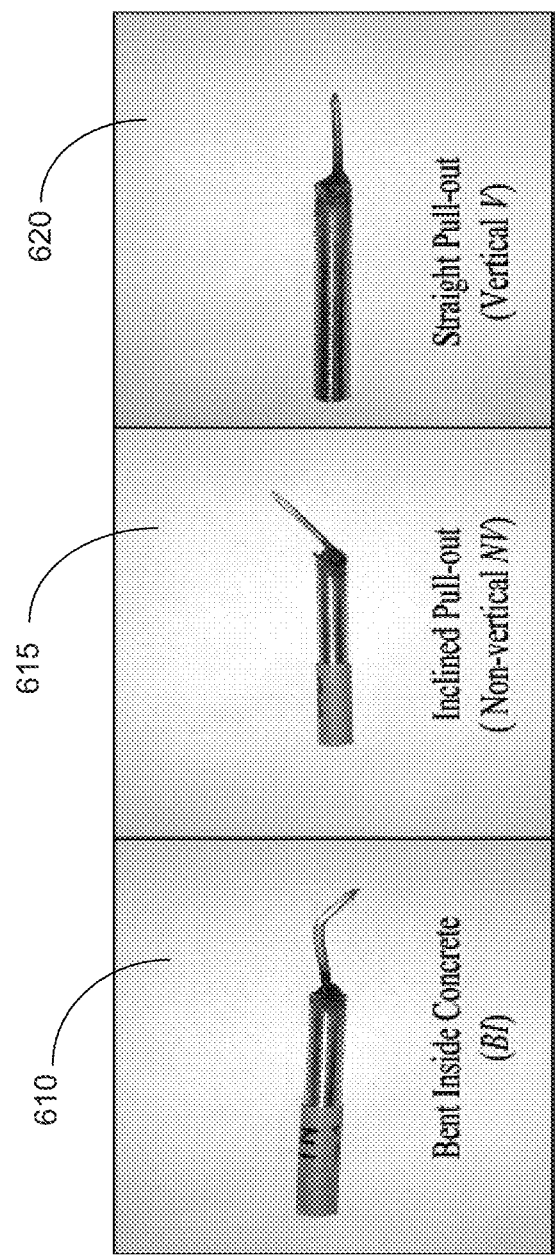
FIG. 6B is an illustrative view of after pull-out configurations of friction nails according to certain embodiments of the disclosure.

FIG. 6B is an illustrative view of after pull-out configurations (610, 615, 620) of friction nails 320 according to certain embodiments of the disclosure. In FIG. 6B, different friction nail configurations may be observed after pull-out. These configurations may be categorized as bent inside concrete (BI) 610, inclined pull-out (non-vertical NV) 615, and straight pull-out (vertical V) 620.

In some embodiment, the alignment and stability of the impact loading machine 305 may affect the friction nails indentation and the eventual pull-out failure. If the impact loading machine 305 is misaligned, then the friction nail penetration may be inclined (NV) at 615. If the machine 305 is not stable and recoils uncontrollably, then the friction nail configuration may be bent inside concrete type (BI) at 610 as the full impact could not be applied in a single loading. However, an aligned and stable impact loading machine 605 may result in a straight indentation and sound pull-out of friction nails 320 as straight (V) at 620.

Tables 2 and 3 show the pull-out capacity, P and rebound value, R of the 38 mm friction nail length with the penetration depth of 10 mm and 20 mm respectively. From Table 3 it can be seen that several values of Schmidt hammer rebound value, R are missing. It is because of the fact that it was difficult to take readings on the nail head as after a few rebound measurements the nail head became slippery and also that a slight misalignment between the friction nail head and Schmidt hammer tip resulted in an error reading.

Therefore, in some embodiments, the maladjustment of Schmidt hammer 210 on the friction nail head 325 may result in several errors. However, erroneous readings may be ignored and may not affect the results. The evaluation method for the pull-out load capacity was derived keeping in reference the 3 mm diameter friction nails which require drilling. The mean pull-out strength for these types of nails ranges between 80 N to 250 N.

TABLE 3

Test Hammer Reading and Pull-out Load for 38 mm Length Nail with 20 mm penetration depth

| Nail No. | $R_1$ | $R_2$ | $R_3$ | $R_{ave}$ | P (N) | Comments |
|---|---|---|---|---|---|---|
| 1 | 22 | 14 | 27 | 21.0 | 79.54 | V |
| 2 | 10 | 17 | — | 13.5 | 49.76 | NV |
| 3 | 27 | 27 | 27 | 27.0 | 106.01 | V |
| 4 | 11 | — | 23 | 17.0 | 76.45 | V |
| 5 | 13 | 11 | 18.5 | 14.2 | 65.00 | V |
| 6 | — | 10 | 18 | 14.0 | 51.41 | NV |
| 7 | 21 | 15 | 18 | 18.0 | 93.78 | V |
| 8 | 13 | 17 | — | 15.0 | 58.10 | V |
| 9 | 20.5 | 21.5 | 23 | 21.7 | 81.25 | NV |
| 10 | — | 17 | 21 | 19.0 | 95.00 | V |
| 11 | 13 | 19 | 16 | 16.0 | 71.57 | V |
| 12 | 29 | 21 | 25 | 25.0 | 101.94 | V |
| 13 | 21 | 18 | 24 | 21.0 | 101.22 | V |
| 14 | 25 | — | 27 | 26.5 | 112.13 | V |
| 15 | 18 | 20 | 19 | 19.0 | 86.65 | V |
| 16 | 10 | 17.5 | 24 | 17.2 | 71.11 | V |
| 17 | 19 | 25 | 13 | 19.0 | 84.21 | V |
| 18 | 30 | 18 | 24 | 24.0 | 99.72 | V |
| 19 | 21 | — | 26 | 23.5 | 101.22 | V |
| 20 | 20.5 | 21.5 | 23 | 21.7 | 93.41 | NV |

Figure 7:
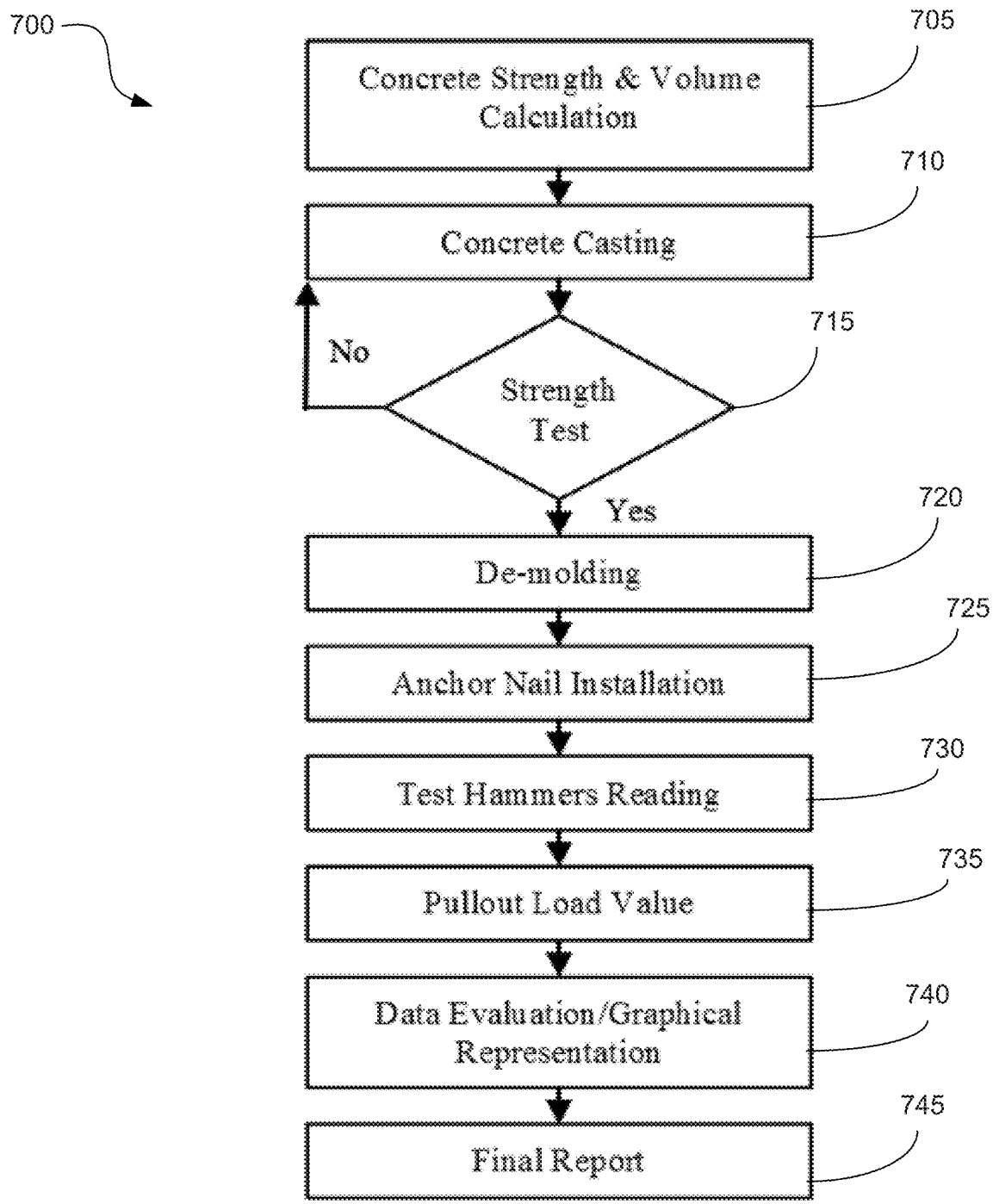
FIG. 7 is a flow chart of a method for determining the pull-out load carrying capacity of an friction nail according to certain embodiments of the disclosure.

FIG. 7 is a flow chart 700 of a method for determining the pull-out load carrying capacity of a friction nail 320 according to certain embodiments of the disclosure. In FIG. 7, at 705 concrete strength and volume calculations may be performed via controller 105 or remote computer 150. At 710, concrete casting may be done to finalize the concrete. At 715, a strength test on the cast concrete may be performed. At 720, upon achieving the desired strength of concrete a demolding may be performed to remove the cast concrete from a mold. At 725, friction/anchor nail installation may be carried-out. At 730, once any misaligned friction nails are identified, a rebound hammer value, R may be taken and recorded or read. At 735, the pull-out load capacity, P may be recorded by physically pulling out the friction nail using a hydraulic jack apparatus as shown in FIG. 4. At 740, a detailed analysis of the results produced by the experimentation may be carried-out to identify the misaligned readings. Several key observations may be recorded during the data collection stage, such as the difficultly of taking the readings exactly on the nail head, as after repeated trials the nail head becomes slippery and results in error of the rebound hammer value, R resulting in the omitted reading shown in Tables 2, 3, and 4. However, this phenomenon can be overcome by using an alignment tube to align the nail head with the rebound hammer shaft. At 745, a report may be generated of the data. For example, the report may show that concrete compaction and placement around the friction nail may have a profound effect on each rebound value, R. Also, specimen with poor compaction of concrete around the friction nail may result in a lower rebound value, whereas specimen with proper compaction may result in higher rebound values.

Figure 8:
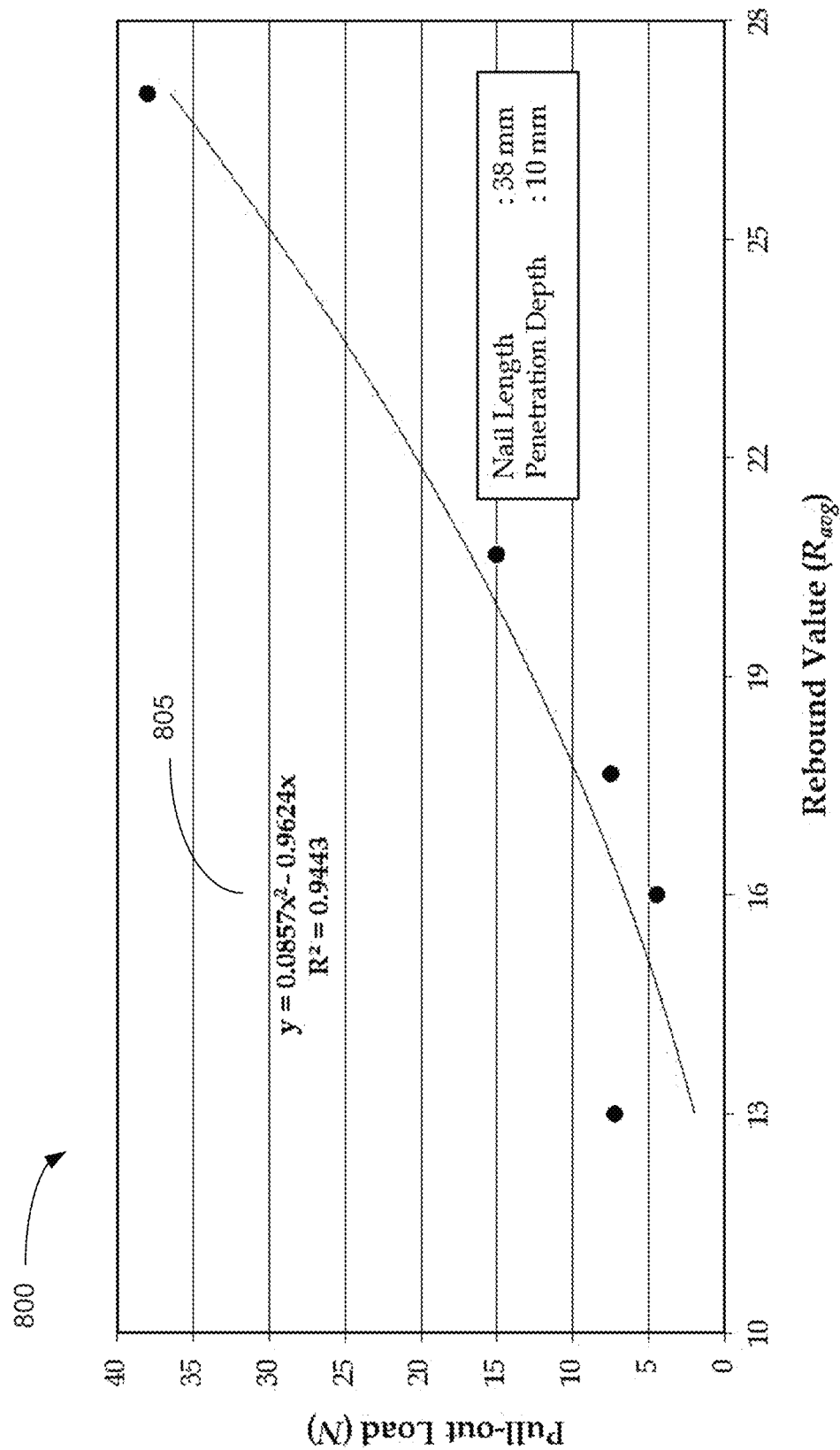
FIG. 8 is a graphical plot of rebound value verses pull-out load for a 38 mm friction nail length with a 10 mm embedment depth according to certain embodiments of the disclosure.

FIG. 8 is a graphical plot 800 of rebound value verses pull-out load for a 38 mm friction nail length with a 10 mm embedment or penetration depth according to certain embodiments of the disclosure. In FIG. 8, certain embodiments show a mathematical relationship 805 between the rebound value, R and the pull-out load capacity, P of $y=0.0857x^2-0.9624x$ for a 38 mm length nail and 10 mm penetration depth, where x is the rebound value and y is the estimated pull-out strength.

Figure 9:
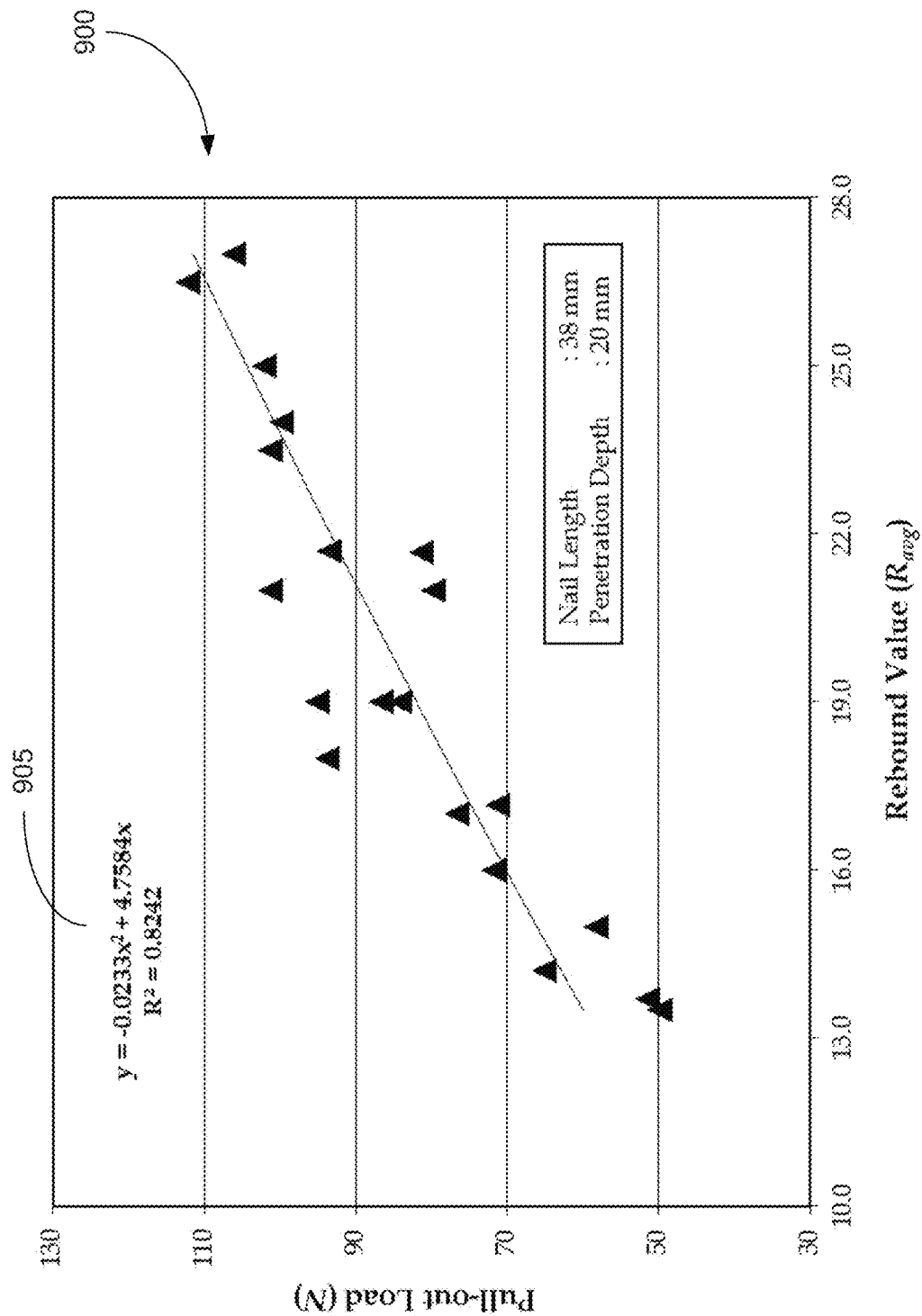
FIG. 9 is a graphical plot of rebound value verses pull-out load for a 38 mm friction nail length with a 20 mm embedment depth according to certain embodiments of the disclosure.

FIG. 9 is a graphical plot 900 of rebound value verses pull-out load for a 38 mm friction nail length with a 20 mm penetration depth according to certain embodiments of the disclosure. In FIG. 9, certain embodiments show a mathematical relationship 905 between the rebound value, R and the pull-out load capacity, P of $y=-0.0233x^2+4.7584x$ for a 38 mm predetermined length nail and 20 mm penetration depth, where x is the rebound value and y is the estimated pull-out strength.

Figure 10:
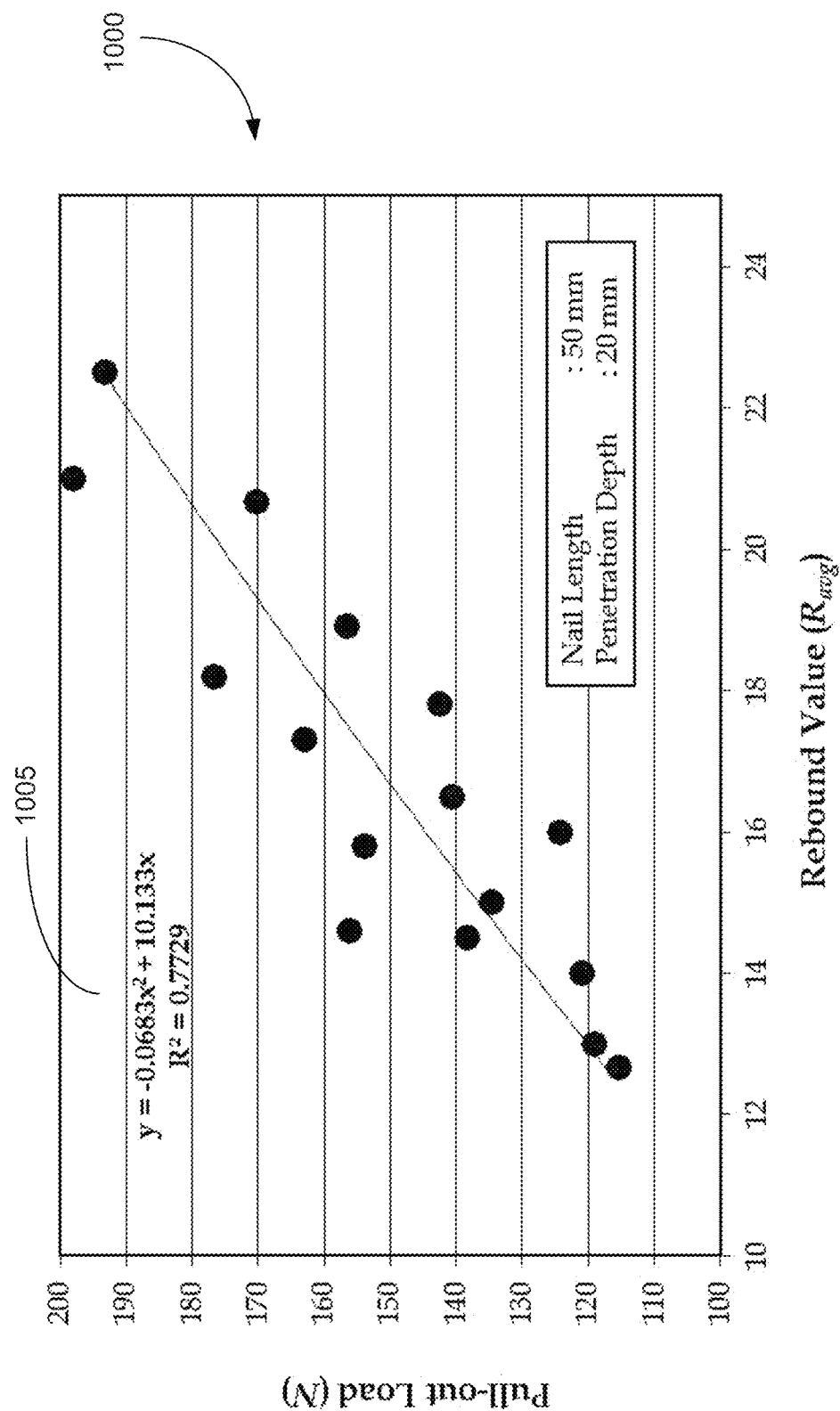
FIG. 10 is a graphical plot of rebound value verses pull-out load for a 50 mm friction nail length with a 20 mm embedment depth according to certain embodiments of the disclosure.

FIG. 10 is a graphical plot 1000 of rebound value verses pull-out load for a 50 mm friction nail length with a 20 mm penetration depth according to certain embodiments of the disclosure. In FIG. 10, certain embodiments show a mathematical relationship 1005 between the rebound value, R and the pull-out load capacity, P of $y=-0.0683x^2+10.133x$ for a 50 mm length nail and 20 mm penetration depth, where x is the rebound value and y is the estimated pull-out strength.

It can be seen from FIGS. 8, 9, and 10 that for vertical friction nails for all the nail lengths and penetration depths show that the rebound value, R to be between 10 and 30 with larger rebound values resulting in larger pull-out values, however as the penetration depth or penetration depth increased the load carrying capacity also increased. Furthermore, it can be seen from the results presented in FIGS. 9 and 10 that as the diameter of the friction nail increased the load carrying capacity also increased for the same penetration depth. Furthermore from FIGS. 8 and 9 it can be seen that for same diameter of the friction nails, as the embedment or penetration depth increases the load carrying capacity increases as well. For friction nails which were not vertical (i.e., bent inside the concrete, BI, close to hole, CH, of a friction nail that was removed because of improper indentation, and inclined, NV) the maximum pull-out load capacity was reduced and also the accompanied damage caused inside the concrete and on the surface of the concrete increased. Also, the non-vertical nails can be distinguished visually and can be identified from the data as the rebound values lie outside the predicted range.

Figure 11:
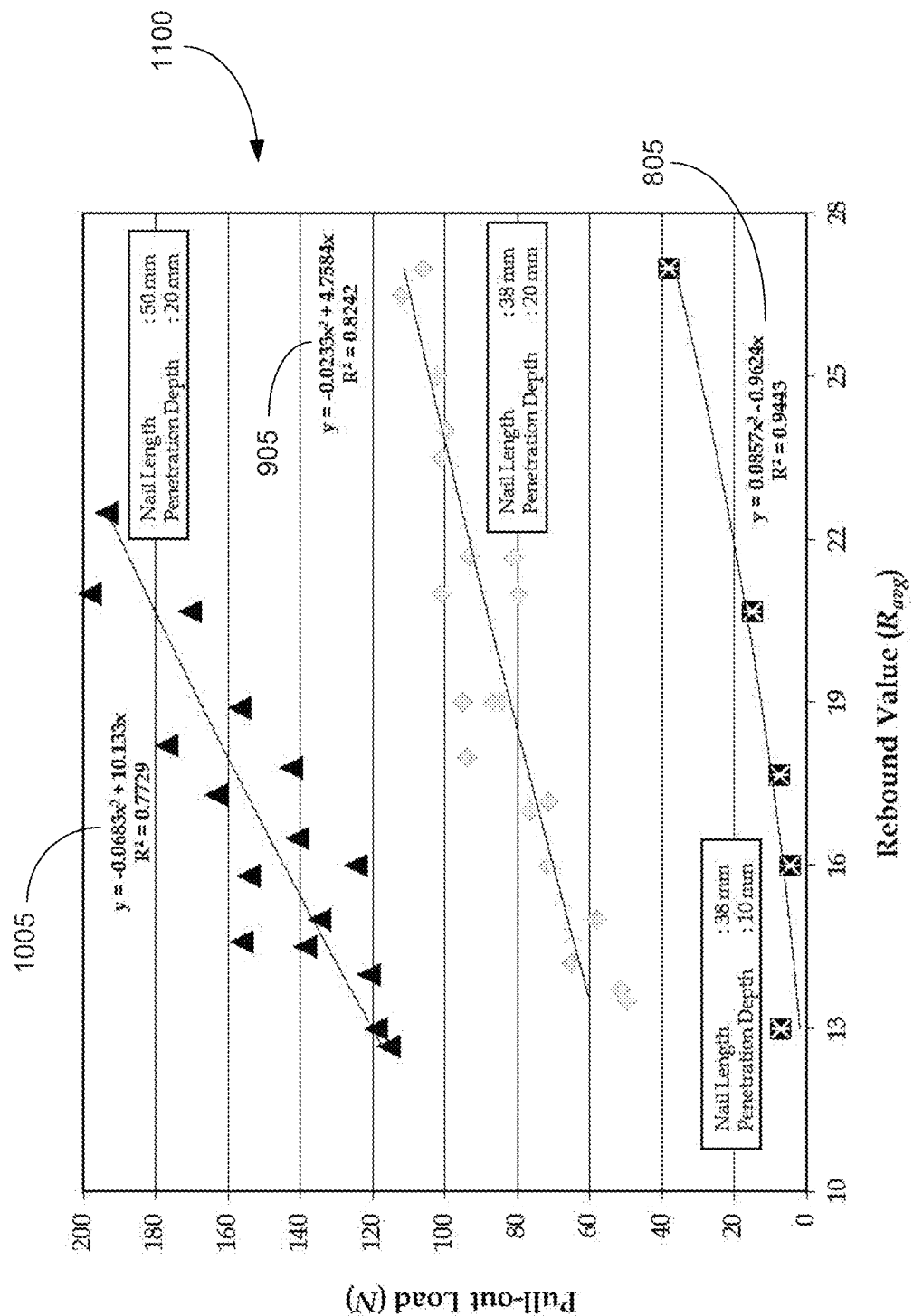
FIG. 11 is a graphical combined plot of rebound value verses pull-out load for the friction nails as depicted in FIGS. 8, 9, and 10 according to certain embodiments of the disclosure.

FIG. 11 is a graphical combined plot 1100 of rebound value verses pull-out load for the friction nails as depicted in FIGS. 8, 9, and 10 according to certain embodiments of the disclosure. In FIG. 11, depicts the combined response of the 50 mm and 38 mm friction nails with 10 mm and 20 mm embedment depths or lengths. In some embodiments, as the diameter increases the load carrying capacity also increases. This phenomenon can be attributed to the larger surface area available for the 50 mm friction nail, which is better able to transmit energy to the surrounding concrete. Also, the maximum pull-out load is governed by the interfacial frictional strength of the friction nail and surrounding concrete and if the damage increased inside the concrete due to non-verticality the resulting pull-out load carrying capacity reduced.

Similar trend was seen for both 38 mm nail lengths. Table 4 shows the pull-out load, P and rebound value, R for the 50 mm friction nail length and FIGS. 9 and 10 show the pull-out and test hammer rebound value, R relationship for the two friction nail lengths.

TABLE 4

Test Hammer Reading and Pull-out Load for 50 mm Length Nail with 20 mm penetration depth

| Nail No. | $R_1$ | $R_2$ | $R_3$ | $R_{ave}$ | P (N) | Comments |
|---|---|---|---|---|---|---|
| 1 | 11 | 16 | 12 | 13.00 | 119.12 | V |
| 2 | 10 | 25.5 | — | 17.80 | 142.43 | BI |
| 3 | 16.5 | 13 | 27 | 18.90 | 156.65 | V |
| 4 | — | 15 | 18 | 16.50 | 140.65 | V |
| 5 | 13 | 15 | — | 14.00 | 120.99 | V |
| 6 | 22 | 18 | 22 | 20.67 | 170.29 | V |
| 7 | 18 | 16 | 18 | 17.30 | 163.10 | V |
| 8 | 12 | 13.5 | 18 | 14.50 | 138.39 | V |
| 9 | 25 | 10 | 9 | 14.60 | 156.16 | V |
| 10 | — | 21 | 11 | 16.00 | 124.36 | NV |
| 11 | — | 14.5 | 22 | 18.20 | 176.74 | V |
| 12 | 21.5 | — | 10 | 15.80 | 153.92 | NV |
| 13 | 28 | — | 17 | 22.50 | 193.29 | V |
| 14 | — | 28 | 14 | 21.00 | 198.09 | V |
| 15 | 15 | — | 15 | 15.00 | 134.56 | V |
| 16 | 12 | 14 | 12 | 12.67 | 115.44 | V |

Figure 12:
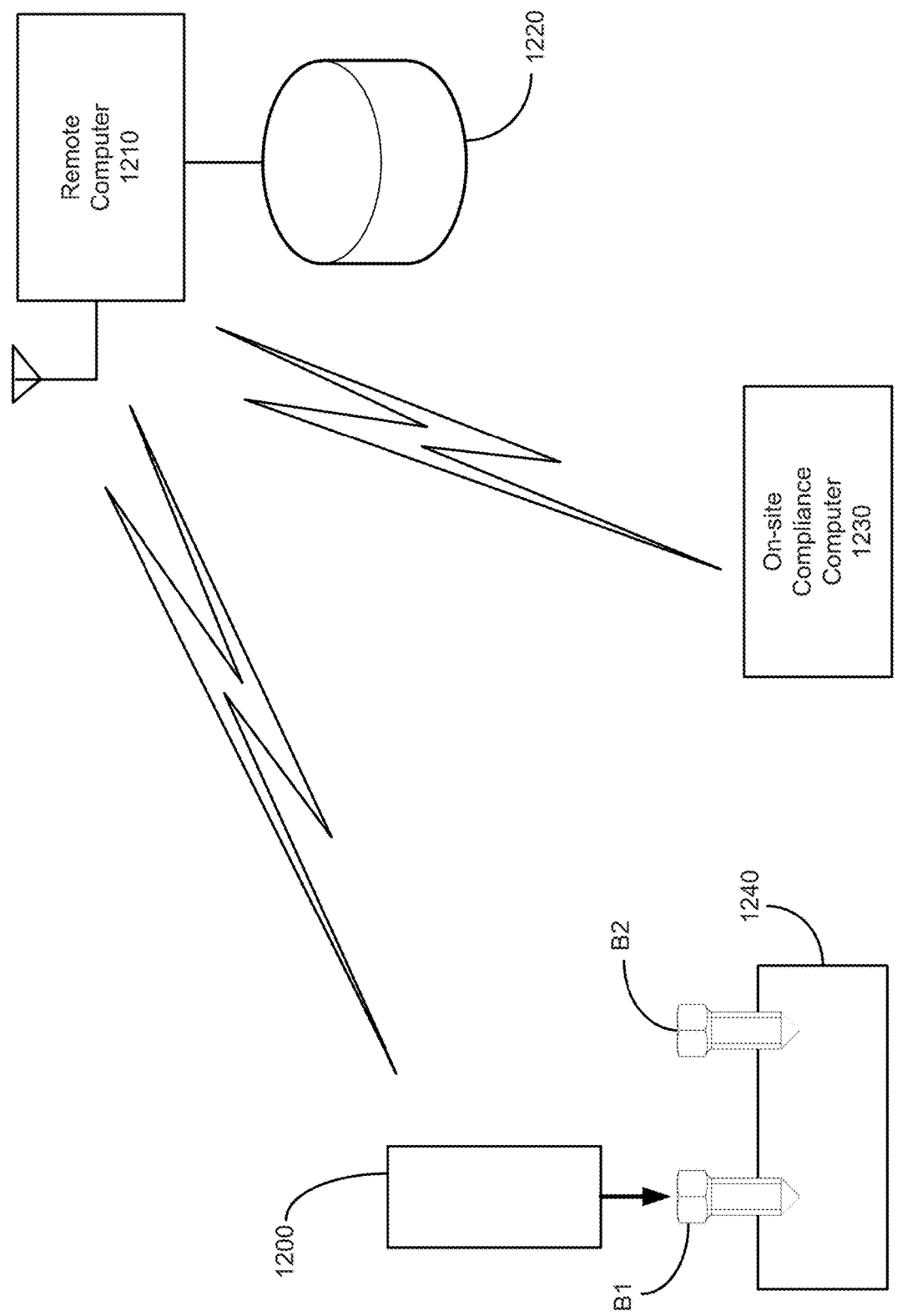
FIG. 12 is a system of a diagram of a Schmidt hammer that is used to measure a pull-out strength of respective friction nails in a construction project according to certain embodiments of the disclosure.

FIG. 12 is a system of a diagram of a Schmidt hammer 1200 that is used to measure a pull-out strength of respective friction nails (B1, B2) in concrete 1240 in a construction project according to certain embodiments of the disclosure. In FIG. 12, the Schmidt hammer 1200 when testing friction nail B1 prepares a message that identifies the location of the Schmidt hammer 1200 at friction nail B1 (determined through triangulation and GPS location as discussed above), friction nail ID, and Schmidt hammer measurement. The message packet in this example is transmitted wirelessly to a remote computer 1210 that receives the packet and compares the Schmidt hammer measurement to a pull-out strength analysis model so as to identify the pull-out strength for friction nail B1. The pull-out strength is then compared to specification requirements stored in the database 1220 to determine whether the measured (estimated) pull-out strength of friction nail B1 is at or above the specified requirement as saved in the database 1220. The conclusion of the compliance analysis is transmitted from the remote computer 1210 to the on-site compliance computer 1230 so that if directive action needs to be taken on friction nail B1 (perhaps through reinstallation), corrective action may be taken shortly after the installation of friction nail B1. On the other hand, if the measurement indicates that the pull-out strength of friction nail B1 surpasses that of the requirement, then a compliance flag is saved in association with the recorded measurement for friction nail B1.

The process then repeats where the Schmidt hammer 1200 is used to measure the pull-out strength of friction nail B2. This process continues throughout all of the friction nails on a construction job so that after all the friction nails have been tested, a real-time compliance report may be prepared and saved at the database 1220. Also, an on-site repair report may be generated for the different friction nails that fail to meet or exceed the pull-out requirements that were previously set in the database 1220.

The remote computer 1210 need not be located on a construction site, but may rather be located at a central facility such that a service may be provided for rapid compliance analysis performed for a construction job. A benefit associated with this approach is that no special skill is needed for performing the compliance testing by the operator of the Schmidt hammer 1200. Also, real-time reports and corrective action may be taken by associating the Schmidt hammer measurement results with the analytical model to predict the pull-out strength through the friction nails, and then comparing those predicted pull-out strengths to required pull-out strengths for the construction job.

Figure 13:
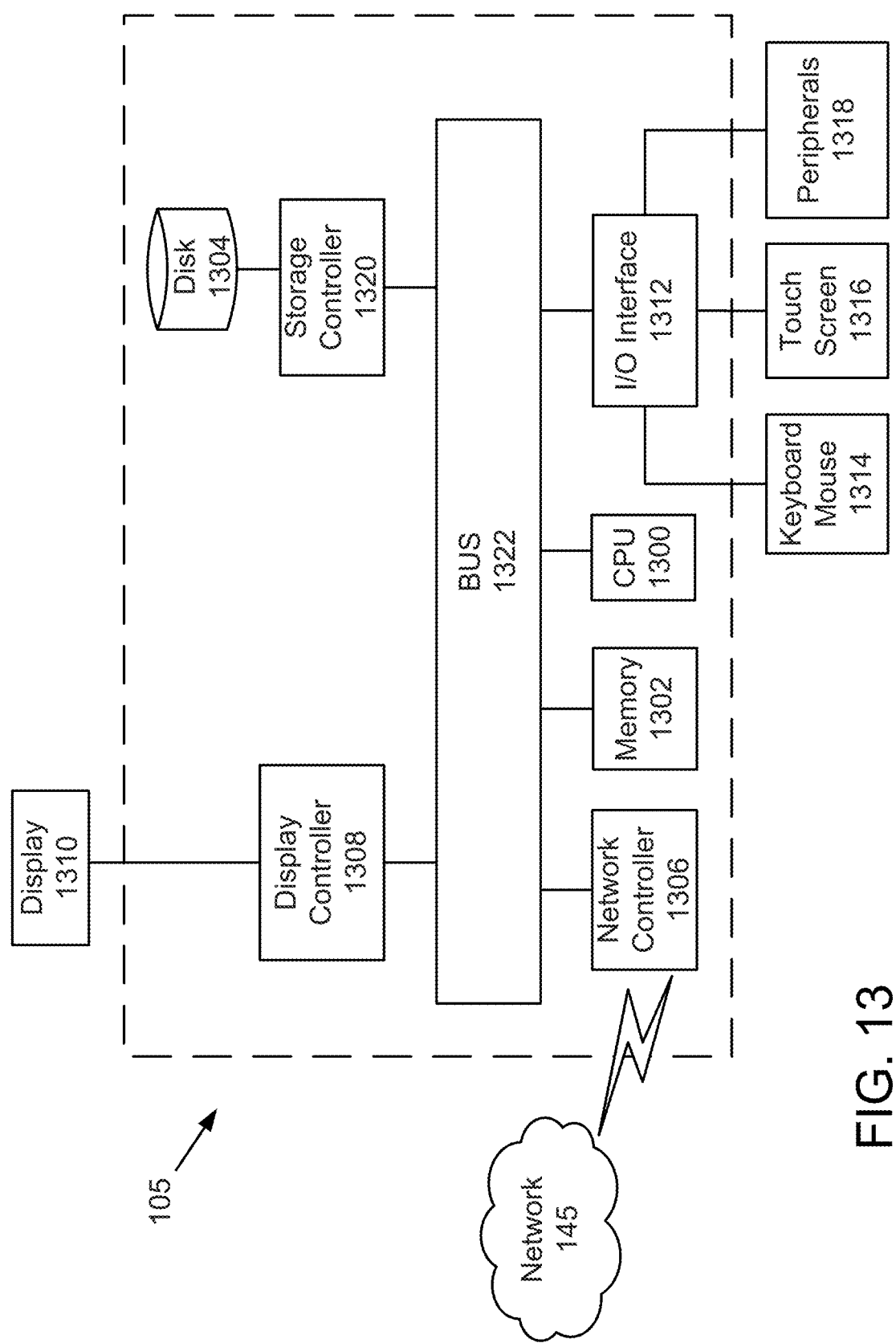
FIG. 13 is a schematic diagram of the comparator of FIG. 1 according to certain embodiments of the disclosure.

FIG. 13 is a schematic diagram of the controller 105 of FIG. 1 according to certain embodiments of the disclosure. In FIG. 13, a hardware description of the controller 105 according to exemplary embodiments is described. In FIG. 13, the controller 105 includes a CPU 1300 which performs the processes described above/below. The process data and instructions may be stored in memory 1302. These processes and instructions may also be stored on a storage medium disk 1304 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the controller 105 communicates, such as a server or computer.

Further, the claimed advancements may be provided as a utility application, background daemon, or component of an operating system, or combination thereof, executing in conjunction with CPU 1300 and an operating system such as Microsoft Windows®, UNIX®, Solaris®, LINUX®, Apple® MAC-OS and other systems known to those skilled in the art.

The hardware elements in order to achieve the controller 105 may be realized by various circuitry elements, known to those skilled in the art. For example, CPU 1300 may be a Xeon® or Core® processor from Intel® of America or an Opteron® processor from AMD® of America, or may be other processor types that would be recognized by one of ordinary skill in the art. Alternatively, the CPU 1300 may be implemented on an FPGA, ASIC, PLD or using discrete logic circuits, as one of ordinary skill in the art would recognize. Further, CPU 1300 may be implemented as multiple processors cooperatively working in parallel to perform the instructions of the inventive processes described above.

The controller 105 in FIG. 13 also includes a network controller 1306, such as an Intel® Ethernet PRO® network interface card from Intel® Corporation of America, for interfacing with network 145. As can be appreciated, the network 145 can be a public network, such as the Internet, or a private network such as an LAN or WAN network, or any combination thereof and can also include PSTN or ISDN sub-networks. The network 145 can also be wired, such as an Ethernet network, or can be wireless such as a cellular network including EDGE, 3G and 4G wireless cellular systems. The wireless network can also be WiFi, Bluetooth, or any other wireless form of communication that is known.

In certain embodiments, apparatus 100 may be controlled and operated remotely via network 145 by a user equipment, such as a smartphone, tablet computer, laptop computer or the like.

The controller 105 further includes a display controller 1308, such as a NVIDIA® GeForce GTX® or Quadro® graphics adaptor from NVIDIA® Corporation of America for interfacing with display 1310, such as a Hewlett Packard® HPL2445w LCD monitor. A general purpose I/O interface 1312 interfaces with a keyboard and/or mouse 1314 as well as a touch screen panel 1316 on or separate from display 1310. General purpose I/O interface also connects to a variety of peripherals 1318 including printers and scanners, such as an OfficeJet® or DeskJet® from Hewlett Packard®.

The general purpose storage controller 1320 connects the storage medium disk 1304 with communication bus 1322, which may be an ISA, EISA, VESA, PCI, or similar, for interconnecting all of the components of the controller 165. A description of the general features and functionality of the display 1310, keyboard and/or mouse 1314, as well as the display controller 1308, storage controller 1320, network controller 1306, and general purpose I/O interface 1312 is omitted herein for brevity as these features are known.

The above-described hardware description is a non-limiting example of corresponding structure for performing the functionality described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. An apparatus for determining a pull-out capacity of a nail disposed in concrete at an installation site, comprising:
control processing circuitry coupled to a remote computer and including a Global Positioning System (GPS) receiver;
a Schmidt hammer electrically connected to the control processing circuitry, wherein the Schmidt hammer is configured to strike the nail during a test event and to record a rebound value for the nail; and
at least three location transmitters at the installation site, each said location transmitter being configured to wirelessly communicate with the control processing circuitry,
wherein the control processing circuitry is configured to determine an estimated pull-out strength for the nail using the rebound value of the nail that resulted from the test event, and based on data in the form of a predetermined nail length, a predetermined nail penetration depth in the concrete, and an estimated predetermined strength of concrete saved in a database, the data being correlated with a predetermined rebound value stored in the database,
wherein the control processing circuitry is further configured to record a predetermined location of the nail being tested by using triangulation according to said at least three location transmitters at the installation site and a GPS coordinate from the GPS receiver, and
wherein each nail tested is assigned a unique ID that is saved in association with the predetermined location of the nail and the rebound value.

2. The apparatus according to claim 1, further comprising a remote computer configured to communicate with the control processing circuitry and to store an estimated pull-out strength of the nail, wherein the control processing circuitry includes a memory and a database.

3. The apparatus according to claim 2, wherein the remote computer is configured to monitor an installation process in real time of each nail, compare the estimated pull-out strength for the nail with a predetermined criteria and provide a certification indication that indicates whether the nail was properly installed and provide a certification report so corrective action may be taken if the nail was installed incorrectly.

4. The apparatus according to claim 3, wherein the remote computer is configured to provide feedback to a compliance computer whether the nail is estimated to have a required pull-out strength.

5. The apparatus according to claim 1, wherein the control processing circuitry calculates the estimated pull-out strength according to at least one of:
$y=0.0857x^2-0.9624x$ for a predetermined length nail and penetration depth;
$y=-0.0233x^2+4.7584x$; and
$y=-0.0683x^2+10.133x$, where x is the rebound value and y is the estimated pull-out strength for the predetermined length nail and penetration depth.

6. A non-destructive method for determining a pull-out capacity of a nail disposed in concrete at an installation site, comprising:
impacting a Schmidt hammer on the nail for a test event, wherein the Schmidt hammer is electronically coupled to a controller, the controller being configured to wirelessly receive data from at least three location transmitters at the installation site;
recording in a computer memory a hammer rebound value from the Schmidt hammer;
determining, using the controller, an estimated pull-out strength for the nail using the hammer rebound value of the nail that resulted from the test event, and based on data in the form of a predetermined nail penetration depth in the concrete stored in a database of the computer memory, a predetermined nail length stored in the database, a predetermined nail vertical alignment in the concrete stored in the database, and an estimated predetermined strength of concrete stored in the database;
comparing the recorded rebound value with a stored value stored in the database that is an association of the hammer rebound value to pull-out strength so as to estimate a pull-out load carrying capacity of the nail; and
recording a predetermined location of the nail being tested by using triangulation according to said at least three location transmitters at the installation site and a GPS coordinate from a GPS receiver,
wherein each nail tested is assigned a unique ID that is saved in association with the predetermined location of the nail and the rebound value.

7. The method according to claim 6, wherein a difference between the hammer rebound value to the stored value indicates whether the nail is installed at an improper angle and whether a contact surface between the nail is less than a predetermined amount.

8. The method according to claim 7, wherein the improper angle is greater than 5 degrees from an angle perpendicular to the concrete.

9. The method according to claim 6, wherein a difference between the hammer rebound value to the stored value indicates whether the concrete has a suboptimal amount of aggregate near the interface with the nail.

10. The method according to claim 9, wherein the controller is configured to compare the estimated pull-out load carrying capacity to a predetermined stored value so as to determine whether the nail satisfies a predetermined pull-out strength.

11. The method according to claim 6, further comprising wirelessly transmitting the estimated pull-out load carrying capacity to a remote computer.

12. The method according to claim 11, wherein the remote computer is configured to monitor an installation process in real time of the nail and other nails and provides feedback to a compliance computer whether the installed nail is estimated to have the required pull-out load carrying capacity.

13. The method according to claim 11, wherein the remote computer is configured to monitor an installation process in real time of each nail, compare the estimated pull-out strength for the nail with a predetermined criteria and provide a certification indication that indicates whether the nail was properly installed and provide a certification report so corrective action may be taken if the nail was installed incorrectly.

14. The method according to claim 11, wherein the Schmidt hammer, the at least three location transmitters, the controller, and the remote computer are connected to a network.

15. The method according to claim 14, wherein the network is at least one of a cellular network, a WiFi network, and an Internet network.

16. A system for determining a pull-out capacity of a nail disposed in concrete at an installation site, comprising:
processing circuitry coupled to a remote computer and including a Global Positioning System (GPS) receiver;
a Schmidt hammer electrically connected to the processing circuitry, wherein the Schmidt hammer is configured to strike the nail during a test event and to record a rebound value for the nail; and
a remote computer configured to communicate with the processing circuitry and to store an estimated pull-out strength of the nail, wherein the processing circuitry includes a memory and a database,
wherein a predetermined location of the nail being tested is determined by using triangulation according to at least three location transmitters at the installation site and a GPS coordinate from the GPS receiver,
wherein the processing circuitry is configured to determine the estimated pull-out strength for the nail using the rebound value of the nail that resulted from the test event, and based on data in the form of a predetermined nail length, a predetermined nail penetration depth in the concrete, and an estimated predetermined strength of concrete saved in a database, the data being correlated with a predetermined rebound value stored in the database, and
wherein each nail tested is assigned a unique ID that is saved in association with the predetermined location of the nail and the rebound value.

17. The system according to claim 16, wherein the processing circuitry calculates the estimated pull-out strength according to at least one of:
$y=0.0857x^2-0.9624x$ for a predetermined length nail and penetration depth;
$y=-0.0233x^2+4.7584x$; and
$y=-0.0683x^2+10.133x$, where x is the rebound value and y is the estimated pull-out strength for the predetermined length nail and penetration depth.

* * * * *